(12) United States Patent
Wang et al.

(10) Patent No.: US 8,421,949 B2
(45) Date of Patent: Apr. 16, 2013

(54) FLAT PANEL DISPLAY DEVICE

(75) Inventors: Wen-Pin Wang, Taipei Hsien (TW); Ping-Sheng Su, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 414 days.

(21) Appl. No.: 12/775,591

(22) Filed: May 7, 2010

(65) Prior Publication Data

US 2011/0013111 A1 Jan. 20, 2011

(30) Foreign Application Priority Data

Jul. 17, 2009 (TW) .............................. 98124237 A

(51) Int. Cl.
*G02F 1/1333* (2006.01)

(52) U.S. Cl.
USPC ........................................................ 349/58

(58) Field of Classification Search .................. None
See application file for complete search history.

(56) References Cited

U.S. PATENT DOCUMENTS

| 7,438,478 B2 | 10/2008 | Kuo |
| 2007/0195493 A1 | 8/2007 | Chang et al. |
| 2008/0307840 A1 | 12/2008 | Yu et al. |

FOREIGN PATENT DOCUMENTS

| CN | 2745084 Y | 12/2005 |
| CN | 1971342 A | 5/2007 |
| TW | M346104 | 7/1997 |

*Primary Examiner* — Lucy Chien
(74) *Attorney, Agent, or Firm* — Dickstein Shapiro LLP

(57) ABSTRACT

A flat panel display device includes a rear housing defining a containing space, a support member disposed in the containing space and secured to the rear housing, a display panel secured to a front face of the support member, a front frame, and a motherboard. The front frame covers a peripheral portion of a front face of the display panel, is connected to the rear housing, and includes light guides extending into corresponding holes in the front frame. The motherboard includes a board body secured to a rear face of the support member, a plurality of press buttons disposed on the board body and extending respectively holes in the rear housing, a plurality of light-emitting diodes disposed at the board body, and a wireless signal receiver disposed on the board body. The light-emitting diodes and the wireless signal receiver correspond to the rear ends of the light guides.

10 Claims, 8 Drawing Sheets

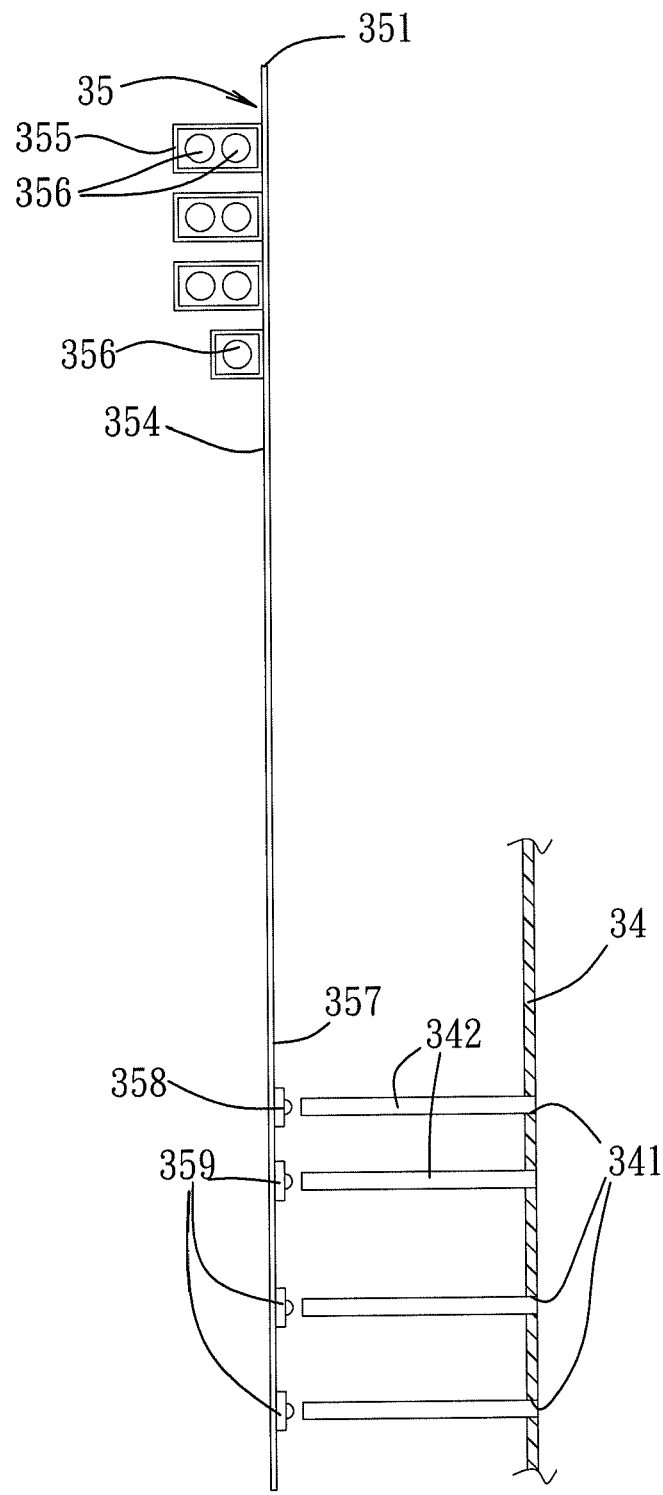
F I G. 8

US 8,421,949 B2

FLAT PANEL DISPLAY DEVICE

CROSS-REFERENCE TO RELATED APPLICATION

This application claims priority of Taiwanese Application No. 098124237, filed on Jul. 17, 2009.

BACKGROUND OF THE INVENTION

1. Field of the Invention

The present invention relates to a flat panel display device, more particularly to a flat panel display device that integrates press buttons, a wireless signal receiver, and light-emitting diodes onto a motherboard.

2. Description of the Related Art

Referring to FIGS. 1 and 2, a conventional Liquid Crystal Display television 1 generally includes a rear housing 11 having a bottom side and a front face, a base 12, a support member 13 having a front face and a rear face, a display panel 14 having a front face, a front frame 15, a motherboard 16, a press button module 17, and a status indicating and signal receiving module 18. The base 12 is secured to the bottom side of the rear housing 11. The support member 13 is secured to the front face of the rear housing 11. The display panel 14 is secured to the front face of the support member 13. The front frame 15 covers a peripheral portion of the front face of the display panel 14 and is secured to the rear housing 11. The motherboard 16 is secured to the rear face of the support member 13.

The press button module 17 includes a circuit board 171 and a plurality of press buttons 172 that are disposed on the circuit board 171. The rear housing 11 has a lateral side 111 formed with a plurality of holes 112. Each of the press buttons 172 extends through a corresponding one of the holes 112 for actuation by pressing. The motherboard 16 is provided with a first slot electrical connector 161. The circuit board 171 has a cable 19 having one end provided with a plug electrical connector 191 for connecting to the first slot electrical connector 161. Through such arrangement, the circuit board 171 is connected electrically to the motherboard 16 and is capable of transmitting control signals generated upon pressing of the press buttons 172 to the motherboard 16. The status indicating and signal receiving module 18 includes a circuit board 181 that has a front face, an infrared receiver 182 that is disposed at the front face of the circuit board 181, and a plurality of light-emitting diodes 183 that are disposed at the front face of the circuit board 181. The front frame 15 is formed with a plurality of holes 151. The infrared receiver 182 and the light-emitting diodes 183 are disposed at positions that correspond to the holes 151, respectively. The infrared receiver 182 is for receiving infrared control signals emitted by a remote controller. On the other hand, the light-emitting diodes 183 are for indicating different operating states. The motherboard 16 further has a second slot electrical connector 162. The circuit board 181 has a cable 20 having one end provided with a plug electrical connector 201 for connecting to the second slot electrical connector 162, such that the circuit board 181 is connected electrically to the motherboard 16. Through such arrangement, the circuit board 181 is capable of transmitting infrared control signals to the motherboard 16, or receiving control signals from the motherboard 16 to activate the light-emitting diodes 183.

During the assembly process of the Liquid Crystal Display television 1, the plug electrical connectors 191, 201 of the cables 19, 20 need to be connected to the first and second slot electrical connectors 161, 162 of the motherboard 16, respectively, so that the press button module 17 and the status indicating and signal receiving module 18 are connected electrically to the motherboard 16. Therefore, amount of labor needed for, complexity of, and cost of assembly are increased. Furthermore, extra cost is incurred because of designing and production of the circuit boards 171, 181 and the cables 19, 20 to ensure the functionalities of the press buttons 172, the infrared receiver 182, and the light-emitting diodes 183.

Therefore, how to design a Liquid Crystal Display television that has reduced costs of designing, assembly, and production is the subject of improvement of the present invention.

SUMMARY OF THE INVENTION

Therefore, an object of the present invention is to provide a flat panel display device in which amount of labor needed for, complexity of, and cost of assembly are reduced.

Another object of the present invention is to provide a flat panel display device that has reduced costs of designing and production.

Accordingly, the flat panel display device of the present invention includes a rear housing, a support member, a display panel, a front frame, and a motherboard.

The rear housing defines a containing space that opens forwardly, and has a lateral side and a plurality of holes that are disposed in the lateral side so that the containing space is in spatial communication with the outside environment through the holes. The support member is disposed in the containing space, is secured to the rear housing, and has a front face and a rear face. The display panel is secured to the front face of the support member and has a front face. The front frame covers a peripheral portion of the front face of the display panel and is connected to the rear housing. The motherboard includes a board body that is secured to the rear face of the support member, and a plurality of press buttons that are disposed on the board body and that extend respectively through the holes in the rear housing for actuation by pressing.

In the aforementioned flat panel display device, the front frame has a hole and includes a light guide. The light guide has a rear end that faces the board body of the motherboard and a front end that extends into the hole. The board body of the motherboard has a front face that faces the support member. The motherboard further includes a wireless signal receiver that is disposed on the front face of the board body at a position corresponding to the rear end of the light guide.

In the aforementioned flat panel display device, the front frame has a plurality of holes and includes a plurality of light guides. Each of the light guides has a rear end that faces the board body of the motherboard and a front end that extends into a corresponding one of the holes. The board body of the motherboard has a front face that faces the support member. The motherboard further includes a plurality of light-emitting diodes that are disposed at the front face of the board body at positions corresponding to the rear ends of the light guides.

In the aforementioned flat panel display device, the front frame has a plurality of holes and includes a plurality of light guides. Each of the light guides has a rear end that faces the board body of the motherboard and a front end that extends into a corresponding one of the holes. The board body of the motherboard has a front face that faces the support member. The motherboard further includes a plurality of light-emitting diodes and a wireless signal receiver that are disposed at the front face of the board body and at positions corresponding the rear ends of the light guides.

Preferably, the flat panel display device is a Liquid Crystal Display television.

According to another aspect, the flat panel display device of the present invention includes a rear housing, a support member, a display panel, a front frame, and a motherboard.

The rear housing defines a containing space that opens forwardly. The support member is disposed in the containing space, is secured to the rear housing, and has a front face and a rear face. The display panel is secured to the front face of the support member and has a front face. The front frame covers a peripheral portion of the front face of the display panel and is connected to the rear housing. The front frame has at least one hole and includes at least one light guide. The light guide has a rear end that faces the board body of the motherboard and a front end that extends into the hole. The motherboard includes a board body that is secured to the rear face of the support member and that has a front face facing the support member, and a wireless signal receiver that is disposed on the front face of the board body at a position corresponding to the rear end of the light guide.

In the aforementioned flat panel display device, the front frame has a plurality of the holes and includes a plurality of the light guides. The motherboard further includes a plurality of light-emitting diodes that are disposed at the front face of the board body. The light-emitting diodes and the wireless signal receiver are disposed at positions that correspond to the rear ends of the light guides.

According to yet another aspect, the flat panel display device of the present invention includes a rear housing, a support member, a display panel, a front frame, and a motherboard.

The rear housing defines a containing space that opens forwardly. The support member is disposed in the containing space, is secured to the rear housing, and has a front face and a rear face. The display panel is secured to the front face of the support member and has a front face. The front frame covers a peripheral portion of the front face of the display panel and is connected to the rear housing. The front frame has a plurality of holes and includes a plurality of light guides. Each of the light guides has a rear end that faces the board body of the motherboard and a front end that extends into a corresponding one of the holes. The motherboard includes a board body that is secured to the rear face of the support member and that has a front face facing the support member. The motherboard further includes a plurality of light-emitting diodes that are disposed at the front face of the board body at positions corresponding to the rear ends of the light guides.

Through integrating the press buttons, the wireless signal receiver, and the light-emitting diodes onto the motherboard, amount of time required for, complexity of, and cost for assembly of the flat panel display device of the present invention are reduced. Costs for designing and production are also reduced.

BRIEF DESCRIPTION OF THE DRAWINGS

Other features and advantages of the present invention will become apparent in the following detailed description of the preferred embodiment with reference to the accompanying drawings, of which:

FIG. 8 is a schematic lateral view of the preferred embodiment to illustrate the wireless signal receiver and light-emitting diodes disposed respectively at positions corresponding to rear ends of light guides.

DETAILED DESCRIPTION OF THE PREFERRED EMBODIMENT

Figure 3:
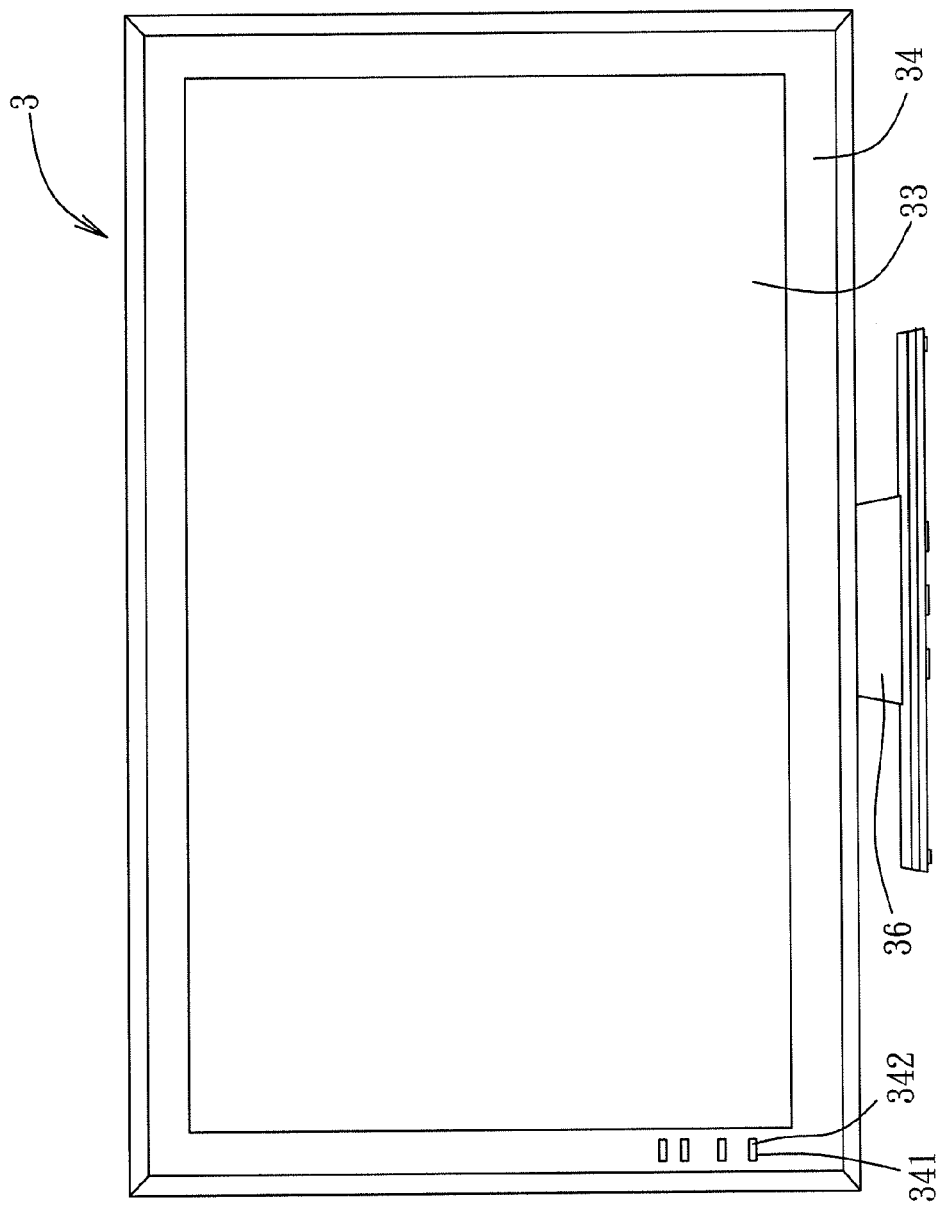
FIG. 3 is a schematic front view of a preferred embodiment of a flat panel display device according to the present invention to illustrate light guides that extend into corresponding holes formed in a front frame.
Figure 4:
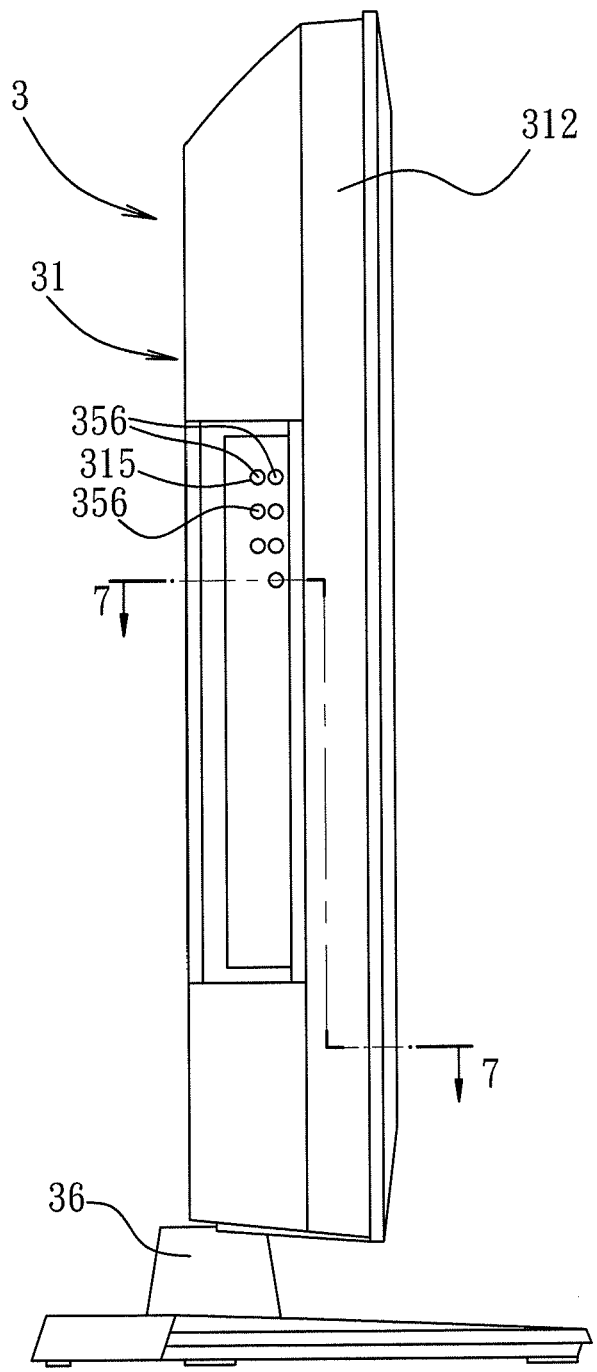
FIG. 4 is a schematic lateral view of the preferred embodiment to illustrate press buttons extending holes that are formed in a rear housing.
Figure 5:
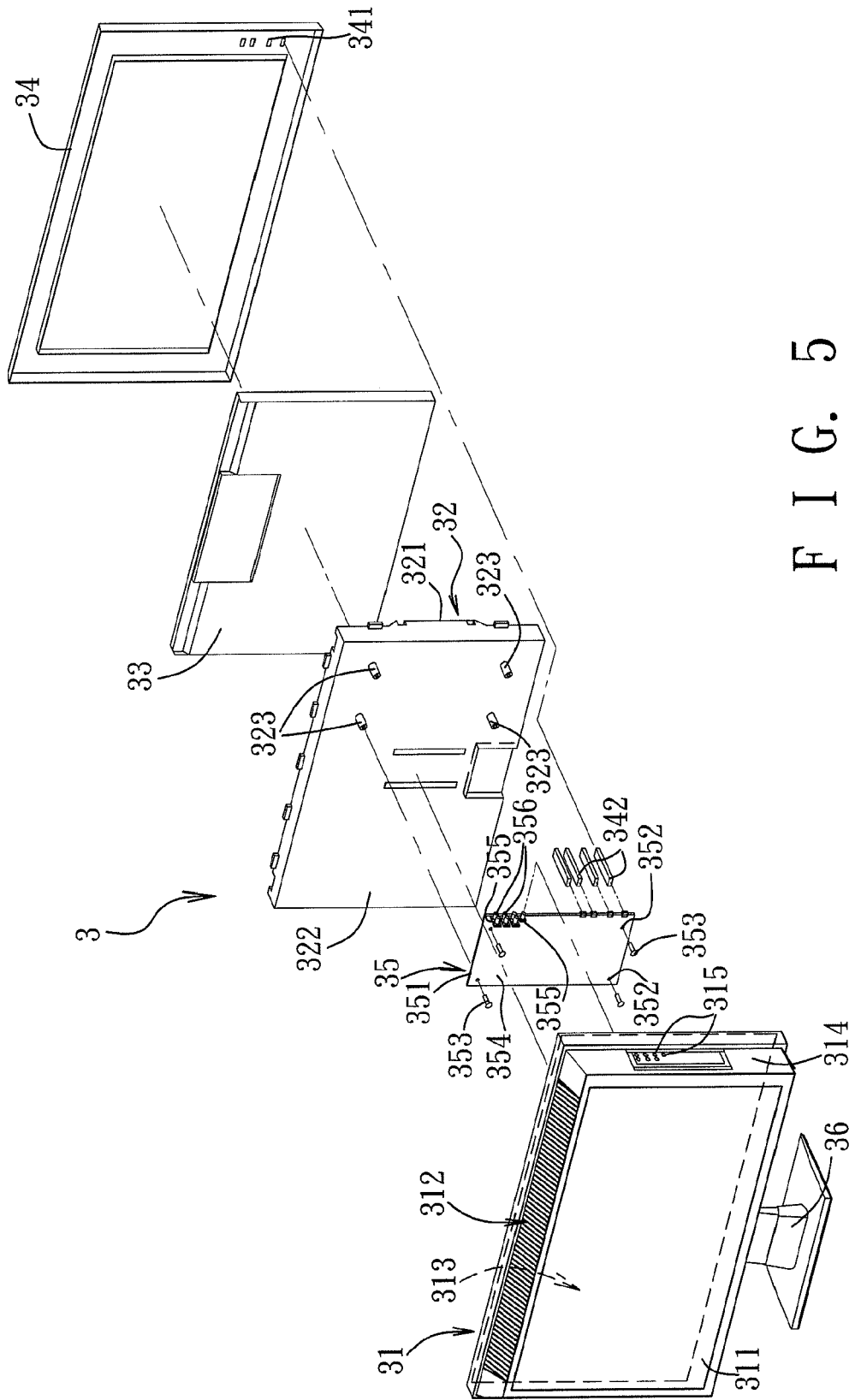
FIG. 5 is an exploded perspective view of the preferred embodiment.
Figure 6:
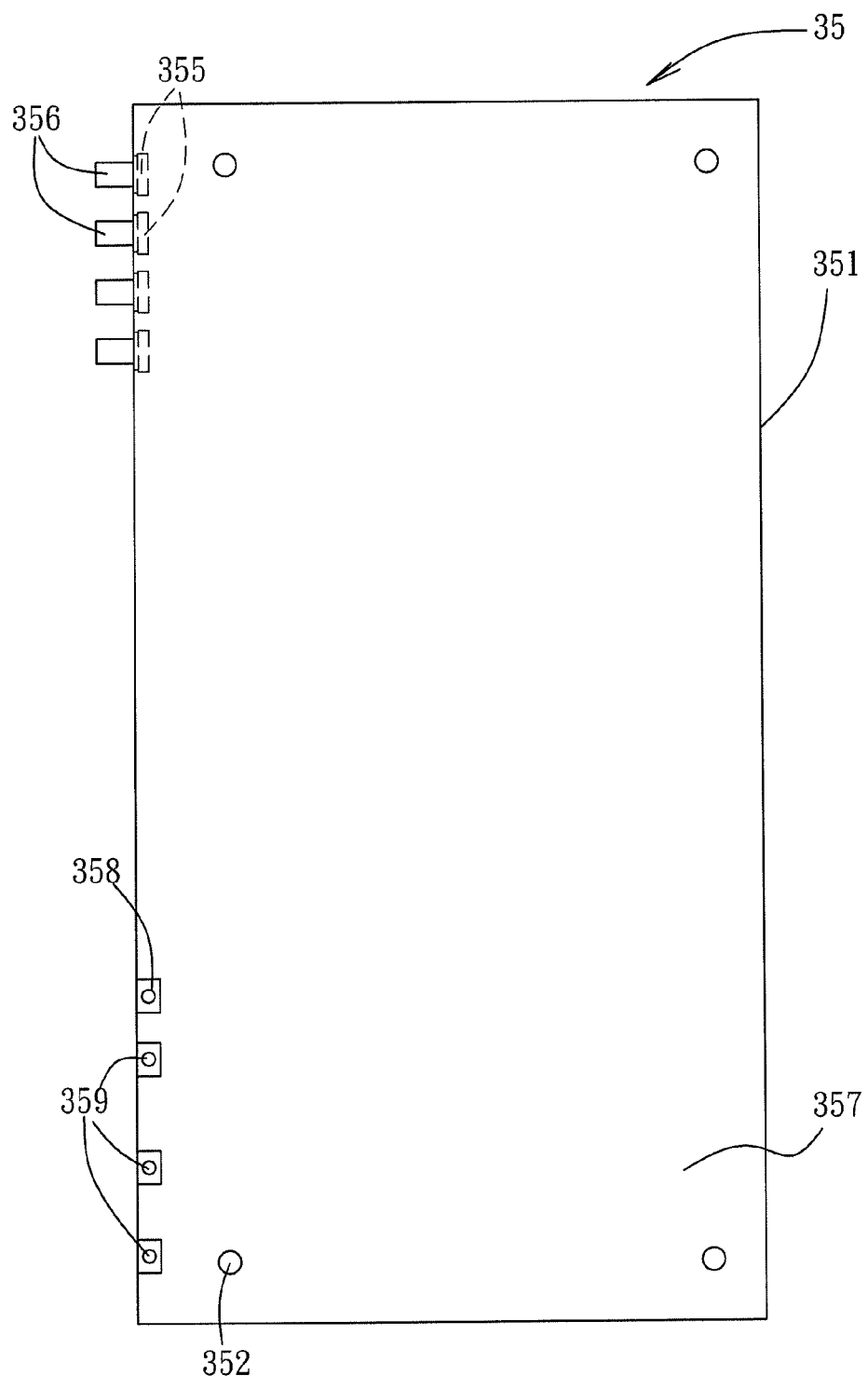
FIG. 6 is a schematic front view of a motherboard of the preferred embodiment.
Figure 7:
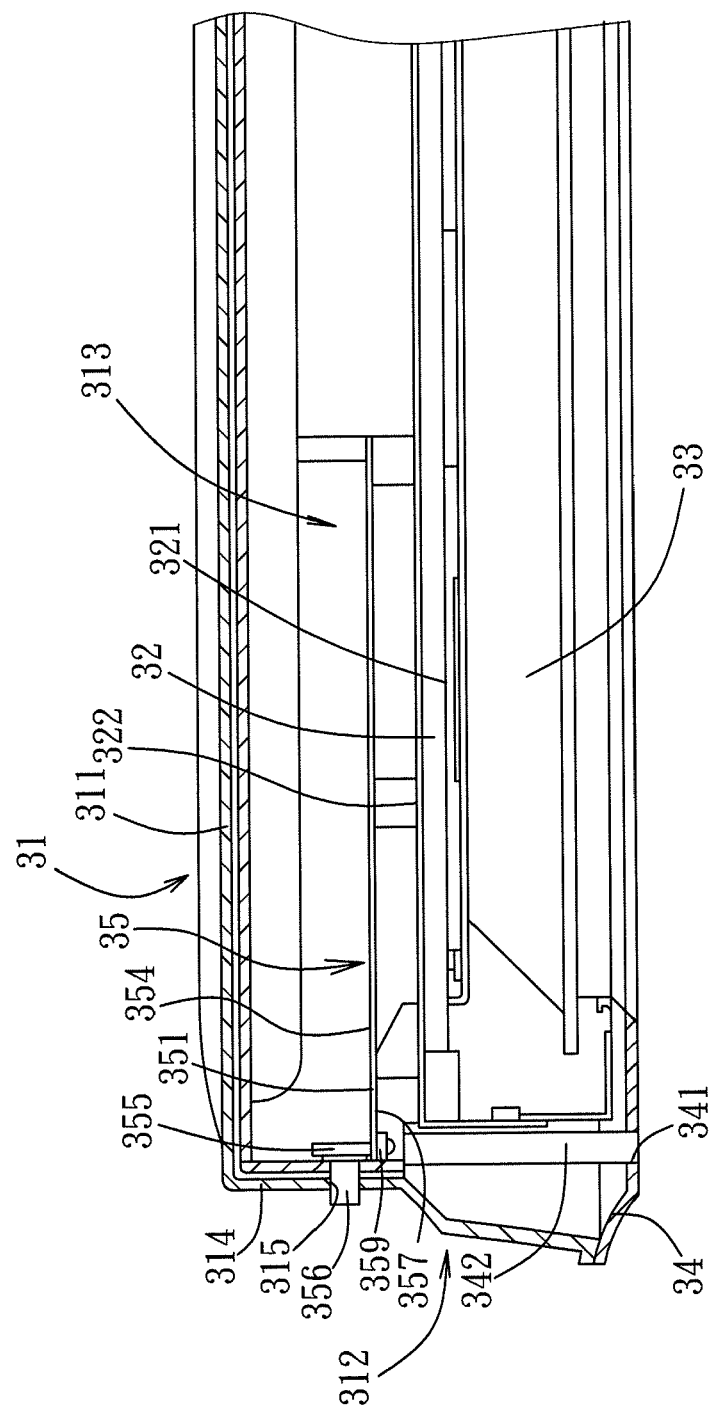
FIG. 7 is a partly sectional view of the preferred embodiment taken along line 7-7 in FIG. 4 to illustrate a press button extending a hole in the rear housing, and to illustrate a wireless signal receiver corresponding to a rear end of a corresponding light guide.

Referring to FIGS. 3, 4, and 5, the preferred embodiment of a flat panel display device 3 according to the present invention is shown to be exemplified as a Liquid Crystal Display television that includes a rear housing 31, a support member 32, a display panel 33, a front frame 34, and a motherboard 35.

Referring to FIGS. 5, 6, 7, and 8, the rear housing 31 includes a base wall 311 and a surrounding wall 312 that extends forwardly from an outer periphery of the base wall 311. The base wall 311 and the surrounding wall 312 cooperate to define a containing space 313 that opens forwardly for receiving the support member 32, the display panel 33, and the motherboard 35. The surrounding wall 312 of the rear housing 31 has a bottom face provided with a base 36. The base 36 can be secured to the bottom face of the surrounding wall 312 by locking or engaging such that the rear housing 31 can stand upright on a flat plane. The support member 32 is disposed in the containing space 313 and can be secured at a middle section of the surrounding wall 312 by locking or engaging. The display panel 33 is secured to a front face 321 of the support member 32 by locking or engaging, and is disposed in the containing space 313. The motherboard 35 can be secured to a rear face 322 of the support member 32 by locking, and is disposed in the containing space 313. The display panel 33 is connected electrically to the motherboard 35 through a cable (not shown). The front frame 34 is for covering a peripheral portion of a front face of the display panel 33, and can be connected to the surrounding wall 312 of the rear housing 31 by locking.

The support member 32 is provided with a plurality of screw sockets 323 on the rear face 322. The motherboard 35 includes a board body 351. The board body 351 has a plurality of positioning holes 352 at positions that correspond to the screw sockets 323. A plurality of screws 353 extend through the positioning holes 352 and engage threadedly the screw sockets 323, thereby securing the motherboard 35 to the support member 32. The board body 351 of the motherboard 35 further has a rear face 354. The motherboard 35 further includes a plurality of protruding pieces 355 protruding from the rear face 354, and a plurality of press buttons 356 disposed respectively on outer faces of the protruding pieces 355. The surrounding wall 312 of the rear housing 31 has a lateral wall part 314 that is formed with a plurality of holes 315. The press buttons 356 correspond to and extend through the holes 315 for actuation by pressing, respectively. In the present embodiment, the topmost pair of press buttons 356 are for showing a configuration menu and selecting a configuration option therein, such as adjusting the brightness and the color of the display panel 33. The pair of press buttons 356 second from the top are for adjusting output volume of the flat panel display device 3. The pair of press buttons 356 third from the top are for selecting a television channel of the flat panel display device 3. The lowermost one of the press buttons 356 is the power button. Of course, arrangement of the press buttons 356 and the functions thereof are not limited to those disclosed in the present preferred embodiment, and may be adjusted according to design requirements.

The front frame 34 has a plurality of holes 341 that are proximate to a lateral side thereof and that are aligned vertically, and includes a plurality of light guides 342 that correspond in number to the holes 341. Each of the light guides 342 has a rectangular shape, is disposed proximate to and spaced apart from a lateral side of the support frame 32, has a front end that extends into a corresponding one of the holes 341, and further has a rear end that faces a front face 357 of the board body 351 of the motherboard 35. The motherboard 35 further includes a wireless signal receiver 358 that is disposed on the front face 357 of the board body 351, and a plurality of vertically aligned light-emitting diodes 359 that are disposed at the front face 357 of the board body 351, that are spaced apart from each other, and that are disposed below the wireless signal receiver 358. The wireless signal receiver 358 and the light-emitting diodes 359 are disposed respectively at positions corresponding to the rear ends of the light guides 342. The wireless signal receiver 358 is an infrared receiver that can receive infrared control signals emitted from a remote controller (not shown) through the corresponding one of the light guides 342. The light-emitting diodes 359 are individually controlled by the board body 351 to indicate different operating states. Each of the light-emitting diodes 359 emits light that propagates through the corresponding one of the light guides 342 and that propagates outwardly of the front face of the front frame 34 so that the user is able to know the current operating state of the flat panel display device 3. In the present embodiment, the three light-emitting diodes 359, respectively from top to bottom, are adapted to emit light when the display panel 33 is showing nothing (picture off), emit light when the flat panel display device 3 is not receiving electrical signals, and emit light when the flat panel display device 3 is receiving channel signals.

Figure 1:
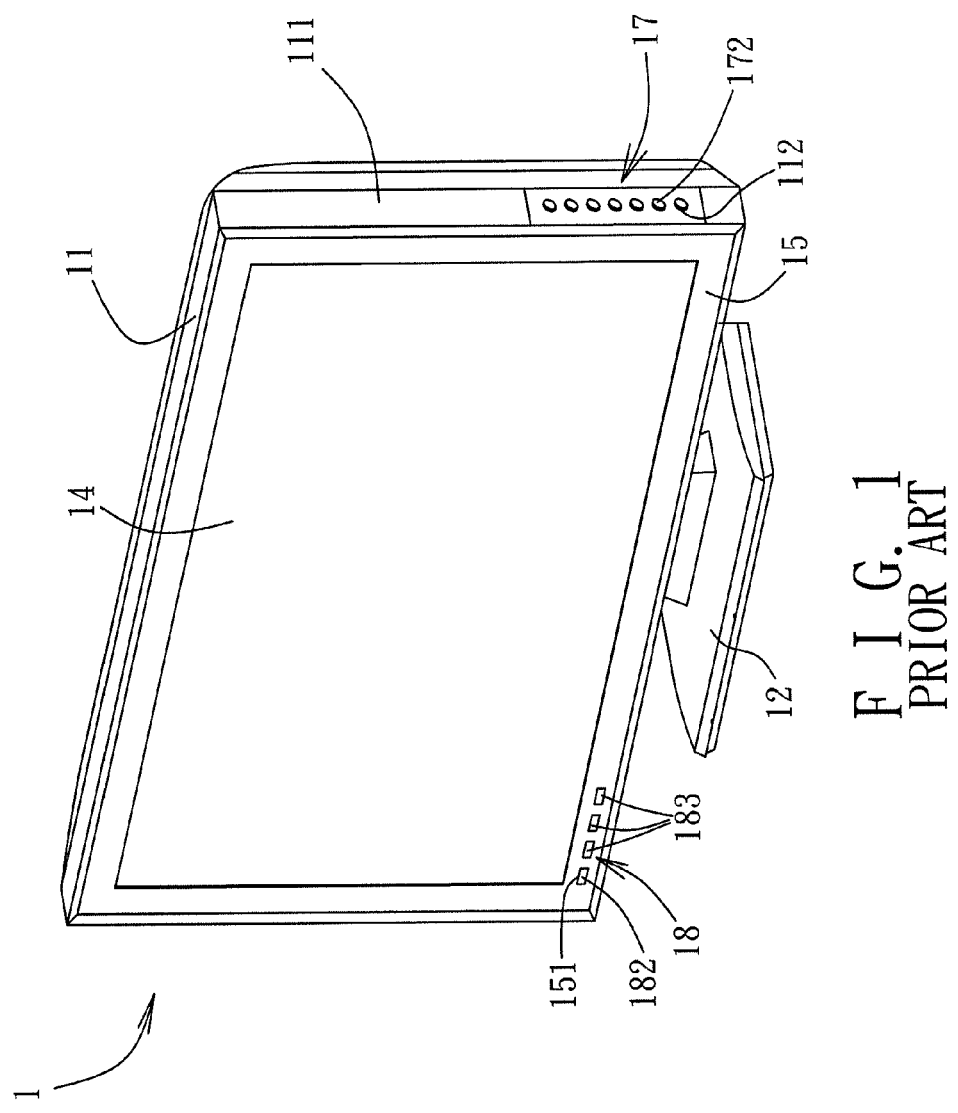
FIG. 1 is a perspective view of a conventional Liquid Crystal Display television.
Figure 2:
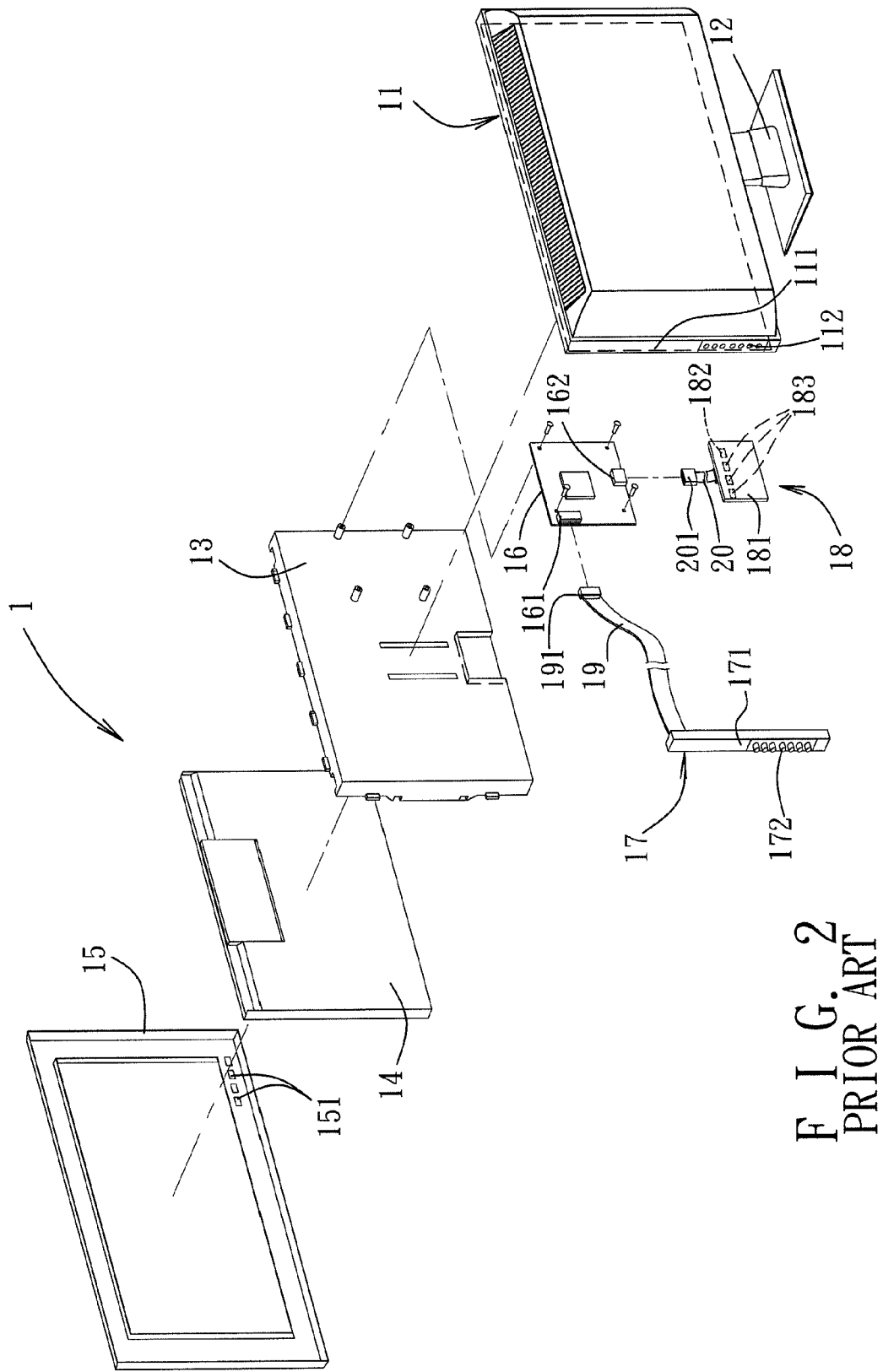
FIG. 2 is an exploded perspective view of the Liquid Crystal Display television of FIG. 1 viewed from the rear to illustrate the assembly relation of a press button module and a status indicating and signal receiving module with a motherboard.

The integration of the press buttons 356, the wireless signal receiver 358, and the light-emitting diodes 359 onto the board body 351 of the motherboard 35 simplifies the assembly process. When the motherboard 35 is secured to the screw sockets 323 of the support member 32, the press buttons 356 extend through the holes 315, and the wireless signal receiver 358 and the light-emitting diodes 359 are disposed respectively at positions corresponding to the rear ends of the light guides 342. In comparison with the prior art as shown in FIG. 2, assembly of the press button module 17 and the status indicating and signal receiving module 18 on the motherboard 16 is no longer required. Furthermore, the flat panel display device 3 of the preferred embodiment does not require the circuit boards 171, 181 and the cables 19, 20 used in the prior art (as shown in FIG. 2).

It is to be noted that, in practice, the motherboard may incorporate only one, two, or all of the press buttons 356, the wireless signal receiver 358, and the light-emitting diodes 359.

In sum, the flat panel display device 3 of the preferred embodiment integrates the press buttons 356, the wireless signal receiver 358, and the light-emitting diodes 359 onto the board body 351 of the motherboard 35, such that amount of time required for, complexity of, and cost for assembly of the flat panel display device 3 are reduced. Costs for designing and production are also reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A flat panel display device comprising:
   a rear housing defining a containing space that opens forwardly, said rear housing having a lateral side and a plurality of holes that are disposed in said lateral side so that said containing space is in spatial connection with the outside environment through said holes;
   a support member disposed in said containing space, secured to said rear housing, and having a front face and a rear face;
   a display panel secured to said front face of said support member and having a front face;
   a front frame covering a peripheral portion of said front face of said display panel and connected to said rear housing; and
   a motherboard including a board body that is secured to said rear face of said support member, and a plurality of press buttons that are disposed directly on said board body and that extend respectively through said holes in said rear housing for actuation by pressing.

2. The flat panel display device as claimed in claim 1, wherein said front frame has a hole and includes a light guide made of a light transmissive material, said light guide having a rear end that faces said board body of said motherboard and a front end that extends into said hole, said board body of said motherboard having a front face that faces said support member, said motherboard further including a wireless signal receiver that is disposed on said front face of said board body, said wireless signal receiver being disposed at a position that corresponds to said rear end of said light guide.

3. The flat panel display device as claimed in claim 1, wherein said front frame has a plurality of holes and includes a plurality of light guides, each of said light guides having a rear end that faces said board body of said motherboard and a front end that extends into a corresponding one of said holes, said board body of said motherboard having a front face that faces said support member, said motherboard further including a plurality of light-emitting diodes that are disposed directly on said front face of said board body, said light-emitting diodes being disposed at positions that correspond to said rear ends of said light guides.

4. The flat panel display device as claimed in claim 1, wherein said front frame has a plurality of holes and includes a plurality of light guides, each of said light guides having a rear end that faces said board body of said motherboard and a front end that extends into a corresponding one of said holes, said board body of said motherboard having a front face that faces said support member, said motherboard further including a plurality of light-emitting diodes and a wireless signal receiver that are disposed at said front face of said board body at positions corresponding to said rear ends of said light guides.

5. The flat panel display device as claimed in claim 1, wherein said flat panel display device is a Liquid Crystal Display television.

6. A flat panel display device comprising:
- a rear housing defining a containing space that opens forwardly;
- a support member disposed in said containing space, secured to said rear housing, and having a front face and a rear face;
- a display panel secured to said front face of said support member and having a front face;
- a front frame covering a peripheral portion of said front face of said display panel and connected to said rear housing, said front frame having at least one hole and including at least one light guide made of a light transmissive material, said light guide having a rear end that faces said board body of said motherboard and a front end that extends into said hole; and
- a motherboard including a board body that is secured to said rear face of said support member and that has a front face facing said support member, and a wireless signal receiver that is disposed on said front face of said board body, said wireless signal receiver being disposed at a position that corresponds to said rear end of said light guide.

7. The flat panel display device as claimed in claim 6, wherein said front frame has a plurality of said holes and includes a plurality of said light guides, said motherboard further including a plurality of light-emitting diodes that are disposed at said front face of said board body, said light-emitting diodes and said wireless signal receiver being disposed at positions that correspond to said rear ends of said light guides.

8. The flat panel display device as claimed in claim 6, wherein said flat panel display device is a Liquid Crystal Display television.

9. A flat panel display device comprising:
- a rear housing defining a containing space that opens forwardly; a support member disposed in said containing space, secured to said rear housing, and having a front face and a rear face;
- a display panel secured to said front face of said support member and having a front face; a front frame covering a peripheral portion of said front face of said display panel and connected to said rear housing, said front frame having a plurality of holes and including a plurality of light guides, each of said light guides having a rear end that faces said board body of said motherboard and a front end that extends into a corresponding one of said holes; and
- a motherboard including a board body that is secured to said rear face of said support member and that has a front face facing said support member, and a plurality of light-emitting diodes that are disposed directly on said front face of said board body, said light-emitting diodes being disposed at positions that correspond to said rear ends of said light guides.

10. The flat panel display device as claimed in claim 9, wherein said flat panel display device is a Liquid Crystal Display television.

* * * * *